United States Patent
Chennuru et al.

(10) Patent No.: US 9,716,724 B1
(45) Date of Patent: Jul. 25, 2017

(54) CLOUD DATA LOSS PREVENTION SYSTEM

(71) Applicant: Skyhigh Networks, Inc., Cupertino, CA (US)

(72) Inventors: Snehal Chennuru, Sunnyvale, CA (US); Sekhar Sarukkai, Cupertino, CA (US)

(73) Assignee: Skyhigh Networks, Inc., Campbell, CA (US)

( * ) Notice: Subject to any disclaimer, the term of this patent is extended or adjusted under 35 U.S.C. 154(b) by 17 days.

(21) Appl. No.: 14/625,571

(22) Filed: Feb. 18, 2015

Related U.S. Application Data

(60) Provisional application No. 61/943,807, filed on Feb. 24, 2014.

(51) Int. Cl.
*H04L 29/06* (2006.01)

(52) U.S. Cl.
CPC ......... *H04L 63/1433* (2013.01); *H04L 63/20* (2013.01); *H04L 63/08* (2013.01)

(58) Field of Classification Search
CPC ............. H04L 9/3213; H04L 29/06986; H04L 63/0807; H04L 63/10; H04L 63/1433; H04L 63/20; H04L 67/10
USPC ....................................... 726/1, 2, 10, 23, 25
See application file for complete search history.

(56) References Cited

U.S. PATENT DOCUMENTS

| | | | | |
|---|---|---|---|---|
| 8,805,968 B2* | 8/2014 | Taylor | ............... | G06F 17/30194 709/219 |
| 8,931,041 B1* | 1/2015 | Banerjee | ............... | H04L 63/102 726/1 |
| 9,001,370 B1* | 4/2015 | Nuggehalli | ........... | H04L 63/083 358/1.15 |
| 9,088,564 B1* | 7/2015 | Hobson | ................. | H04L 63/083 |
| 9,118,685 B1* | 8/2015 | Brocco | ................. | H04L 63/102 |
| 9,137,131 B1* | 9/2015 | Sarukkai | ............. | H04L 43/0876 |
| 9,418,216 B2* | 8/2016 | Wetter | .................. | G06F 21/335 |
| 9,479,503 B2* | 10/2016 | Griffin | ................ | H04L 63/0884 |
| 2009/0249440 A1* | 10/2009 | Platt | .................... | H04L 63/0815 726/1 |
| 2012/0240183 A1* | 9/2012 | Sinha | .................... | H04W 12/08 726/1 |

(Continued)

FOREIGN PATENT DOCUMENTS

CN 102710630 A * 10/2012

OTHER PUBLICATIONS

Buecker, "Cloud Security Guidance", IBM Corp., redbooks, 2009, 22 pages.*

(Continued)

*Primary Examiner* — Luu Pham
*Assistant Examiner* — Walter Malinowski
(74) *Attorney, Agent, or Firm* — Van Pelt, Yi & James LLP

(57) ABSTRACT

A cloud based data loss prevention (DLP) system ("cloud DLP system") implements offline scanning of content stored in a cloud-based service belonging to an enterprise in accordance with the enterprise's policy and control. The cloud DLP system provides alerts or remediation in response to detection of non-compliance cloud content. In some embodiments, the cloud DLP system is provided with the access credential of the enterprise to access the cloud-based service. In other embodiments, the enterprise's login credential remains within the enterprise data network and an on-premises client obtains an access token for the cloud DLP system.

16 Claims, 6 Drawing Sheets

(56) References Cited

U.S. PATENT DOCUMENTS

| | | | | |
|---|---|---|---|---|
| 2013/0024919 | A1* | 1/2013 | Wetter | G06F 21/335 726/6 |
| 2013/0312067 | A1* | 11/2013 | Ogura | H04L 65/1069 726/4 |
| 2013/0326513 | A1* | 12/2013 | Shlomai | G06F 9/45537 718/1 |
| 2013/0332575 | A1* | 12/2013 | Song | H04L 67/10 709/219 |
| 2014/0007239 | A1* | 1/2014 | Sharpe | G06F 21/561 726/24 |
| 2014/0020034 | A1* | 1/2014 | Manchester | H04N 21/23439 725/86 |
| 2014/0020072 | A1* | 1/2014 | Thomas | H04L 63/0815 726/7 |
| 2014/0053280 | A1* | 2/2014 | Durazzo | H04L 63/0281 726/28 |
| 2014/0075568 | A1* | 3/2014 | Sathyadevan | G06F 21/6218 726/27 |
| 2014/0082717 | A1* | 3/2014 | Kang | G06F 21/00 726/9 |
| 2014/0101725 | A1* | 4/2014 | Shinoda | G06F 21/44 726/4 |
| 2014/0259190 | A1* | 9/2014 | Kiang | G06F 21/6218 726/30 |
| 2014/0280961 | A1* | 9/2014 | Martinez | H04L 41/5054 709/226 |
| 2014/0331060 | A1* | 11/2014 | Hayton | G06F 21/31 713/186 |
| 2014/0366080 | A1* | 12/2014 | Gupta | H04L 63/0807 726/1 |
| 2015/0026756 | A1* | 1/2015 | Reddy | H04W 12/08 726/1 |
| 2015/0100357 | A1* | 4/2015 | Seese | G06Q 10/0631 705/7.12 |
| 2015/0121462 | A1* | 4/2015 | Courage | H04L 63/08 726/4 |
| 2015/0127370 | A1* | 5/2015 | Cornelis | G06Q 30/04 705/2 |
| 2015/0127546 | A1* | 5/2015 | Saxena | H04L 63/00 705/65 |
| 2015/0215332 | A1* | 7/2015 | Curcic | H04L 63/1433 726/25 |
| 2015/0248435 | A1* | 9/2015 | Solheim | G06F 9/5072 707/610 |
| 2016/0044035 | A1* | 2/2016 | Huang | H04L 63/0272 726/4 |

OTHER PUBLICATIONS

Anonymous, "Advanced Cloud—Cloud Instance Open Authentication (OAuth) Security Mechanism", IPCOM000205927D, Apr. 8, 2011, 5 pages.*

Pandey, "Towards Management of Machine to Machine Networks", Network Operations and Management Symposium ( APNOMS ), Sep. 21-23, 2011, 7 pages.*

Lakshman, "Enhancing Enterprise Field Productivity via Cross Platform Mobile Cloud Apps", MCS'11, Jun. 28, 2011, Bethesda, Maryland, USA, 6 pages.*

Murray, "Enterprise Grade Cloud Computing", WDDDM'09, Nuremberg, Germany, Mar. 31, 2009, 1 page.*

Jana, "Management of Identity and Credentials in Mobile Cloud Environment", ICACSIS 2013, IEEE, 2013, pp. 113-118.*

* cited by examiner

CLOUD DATA LOSS PREVENTION SYSTEM

CROSS REFERENCE TO OTHER APPLICATIONS

This application claims priority to U.S. Provisional Patent Application No. 61/943,807, entitled CLOUD DATA LOSS PREVENTION SYSTEM, filed Feb. 24, 2014, which is incorporated herein by reference for all purposes.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With the proliferation of cloud-based services, in particular, cloud-based storage services, and the increased usage of mobile devices, enterprises are finding it difficult to determine if sensitive data is being sent out of the enterprise's premises. Data loss prevention (DLP) has become an important issue for enterprises using cloud-based services. Existing solutions for data loss prevention includes deploying on-premises DLP systems to monitor outgoing network traffic and to scan computers in the enterprise to ensure policy compliance. However, existing data loss prevention solutions do not have the capability to monitor the usage of cloud services as the data flow to these services are encrypted and the cloud usage could be carried out in a public network using mobile devices, outside of the enterprise's control.

BRIEF DESCRIPTION OF THE DRAWINGS

Various embodiments of the invention are disclosed in the following detailed description and the accompanying drawings.

DETAILED DESCRIPTION

Figure 1:
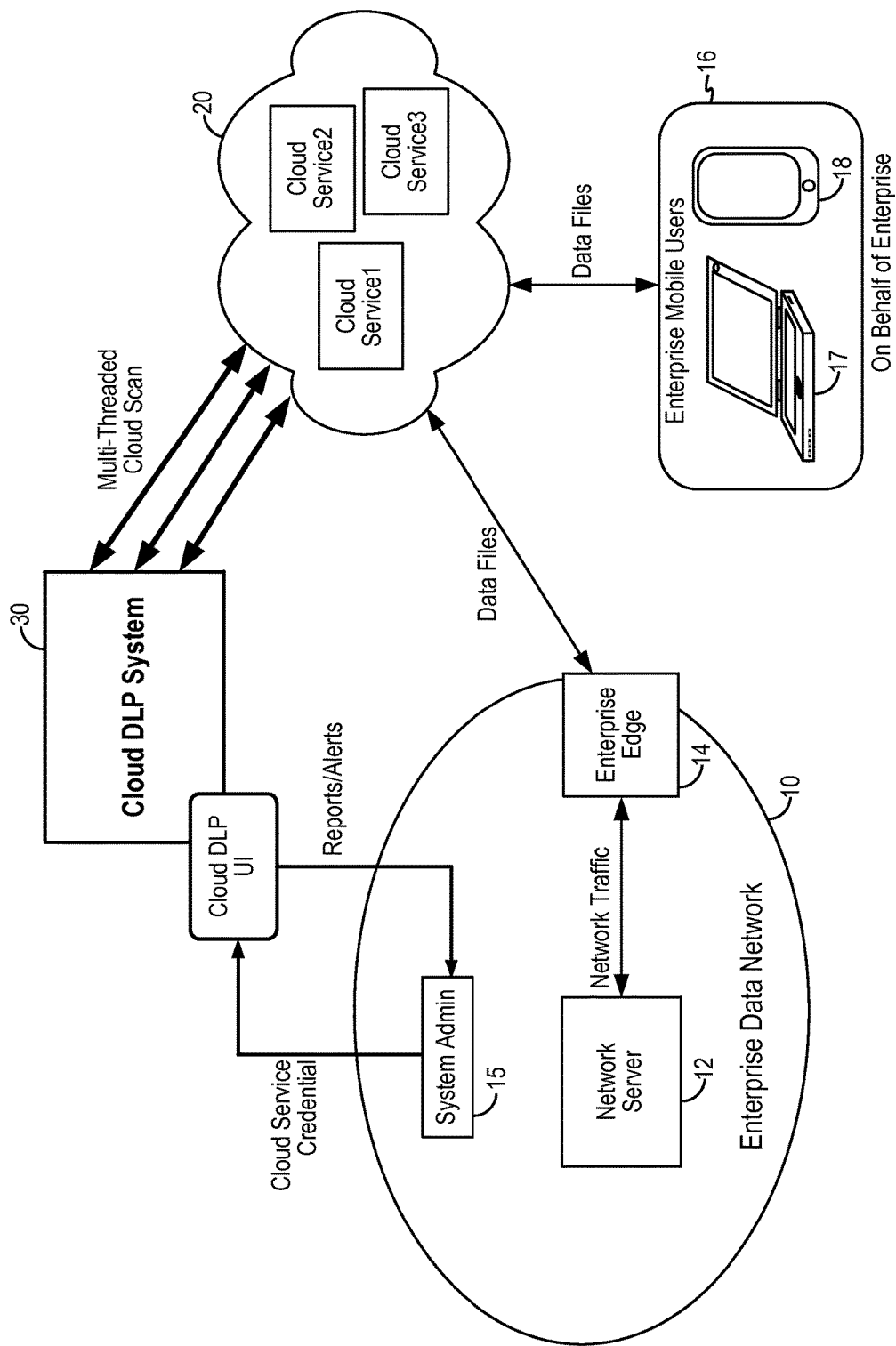
FIG. 1 is a diagram illustrating an environment in which the cloud DLP system of the present invention can be deployed in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a cloud based data loss prevention (DLP) system ("cloud DLP system") implements offline scanning of content stored in a cloud-based service belonging to an enterprise in accordance with the enterprise's policy and control. In this manner, the cloud DLP system of the present invention provides the enterprise with visibility into possible violation of enterprise's data security policy as related to the usage of cloud based services.

In some embodiments, the cloud DLP system is an off-premises system of the enterprise and performs cloud content scanning independent of the network traffic of the enterprise. Thus, the day-to-day activities of the enterprise are not interrupted. Rather, the cloud DLP system runs in the background and performs continuous scanning of the enterprise's cloud content to ensure compliance with the enterprise's control policy. In one example, the cloud DLP system may be configured to scan for confidential information being stored on the cloud based services. In another example, the cloud DLP system may be configured to scan for stored data that are not in compliance with the enterprise's data security policy.

Although it is known to deploy on-premises DLP solutions to scan outgoing network traffic, the use of an off-premises cloud-based DLP system provides particular advantages. First, the cloud DLP system eliminates the need for the enterprise to maintain hardware and/or software to implement data loss prevention measures. The enterprise is relieved of the burden of maintaining on-site hardware and systems to provide data loss prevention analysis. Second, the cloud based DLP System can be configured using distributed computing technology for scalability to handle any amount of data volume.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" refers to data and content being stored on a cloud-based service. The cloud-based service may be a cloud storage service or other types of cloud services. The cloud content may be stored as data files, documents, or in other formats.

FIG. 1 is a diagram illustrating an environment in which the cloud DLP system of the present invention can be deployed in some embodiments. Referring to FIG. 1, an enterprise may operate an enterprise data network 10 including one or more network servers 12. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as Cloud Service 1, Cloud Service 2, and Cloud Service 3. Network traffic form the network server 12 travels to the enterprise network edge 14 and then onto the cloud service providers. For example, users of the enterprise may upload data files or other data content to be stored on one or more cloud services on the public data network 20. In other examples, the enterprise may include one or more mobile users 16 who access the cloud services using mobile computing devices, such as a laptop computer 17 or a mobile phone 18. The mobile users may upload data files or other data content to be stored on one or more cloud services on the public data network 20.

To implement data loss prevention measures, the enterprise may employ the cloud based data loss prevention system 30 ("cloud DLP system") of the present invention to scan and examine the cloud content being stored on the cloud services on behalf of the enterprise. The cloud DLP system 30 is a computing system deployed on a data network outside of the enterprise data network 10. In one embodiment, the cloud DLP system 30 is deployed on the public data network 20. In other embodiments, the cloud DLP system 30 may be deployed on a private data network apart from the enterprise data network 10. Accordingly, the cloud DLP system 30 is off-premises of the enterprise data network.

In embodiments of the present invention, the cloud DLP system 30 is provided with the cloud service access credential, such as the administrative credential or the login credential, of the enterprise for each cloud service provider. For example, a system administrator may provide the login credential for the cloud services being used by the enterprise through a user interface of the cloud DLP system 30. The cloud DLP system 30 uses the login credential to obtain access tokens from the one or more cloud service providers.

With the proper access authorization and access tokens, the cloud DLP system 30 may then perform scanning of the cloud content stored on the one or more cloud service providers (such as Cloud Service 1, Cloud Service 2, and Cloud Service 3) that belongs to the enterprise. In embodiments of the present invention, the cloud DLP system 30 uses the cloud services' application programming interface (API) to access events and contents at the cloud service providers.

In some embodiments, the cloud DLP system 30 uses the cloud service provider's event API to poll for new files or documents that have been uploaded by users of the enterprise. Cloud DLP system 30 continuously polls the cloud service's event API to detect for arrival of new documents or new data content. When an event is detected, the cloud DLP system 30 retrieves or downloads the file or document from the cloud service and performs content inspection. The cloud DLP system 30 checks the files or documents for compliance with rules and policies set up by the enterprise. In some examples, the cloud DLP system 30 may check the files and documents for content that may appear to be social security numbers, or credit card numbers, or keywords specified by the enterprise, or word phrases and expressions of interest. In the event that the cloud DLP system 30 detects a violation or non-compliance of the enterprise's control and security policies, the cloud DLP system 30 may flag or identify the non-compliance document or file or content. In some embodiment, the cloud DLP system 30 provides reports or alerts to the enterprise listing the detected violations or non-compliance. In one example, the cloud DLP system 30 provides reports or alerts of the violations or suspected violations to a system administrator 15 of the enterprise 10 through the user interface of the cloud DLP system 30. The system administrator 15 may access the user interface of the cloud DLP system 30 to access or obtain the reports and alerts. The system administrator 15 may then take action based on the reports and alerts received from the cloud DLP system 30.

In some embodiments, the cloud DLP system 30 may be configured to take remediation measures. For example, the remediation measures may include deleting the non-compliance data from the cloud service provider. Alternately, the cloud DLP system 30 may quarantine the non-compliance data on the cloud service provider to prevent unauthorized access. In some embodiments, the cloud DLP system 30 may be configured to apply remediation measures for specific types of policy violations.

In some embodiments, the cloud DLP system is configured as a distributed real-time computing system configured to process large streams of data. In this manner, the cloud DLP system may be scaled on demand to provide the necessary computing capacity to handle the data volume of the enterprise. Using the distributed computing scheme, the cloud DLP system 30 implements multi-threaded scanning of the enterprise's cloud content. The cloud DLP system may further employ search index technology. Multiple computing devices or processes are deployed in parallel and coordinate among themselves to scan the cloud content belonging to the enterprise and stored on one or more cloud service providers. When implemented as a distributed computing system, the cloud DLP system may distribute the access tokens to all the processors of the distributed computing system to enable each processor to gain access to the cloud content of the enterprise on the one or more cloud service providers.

Figure 2:
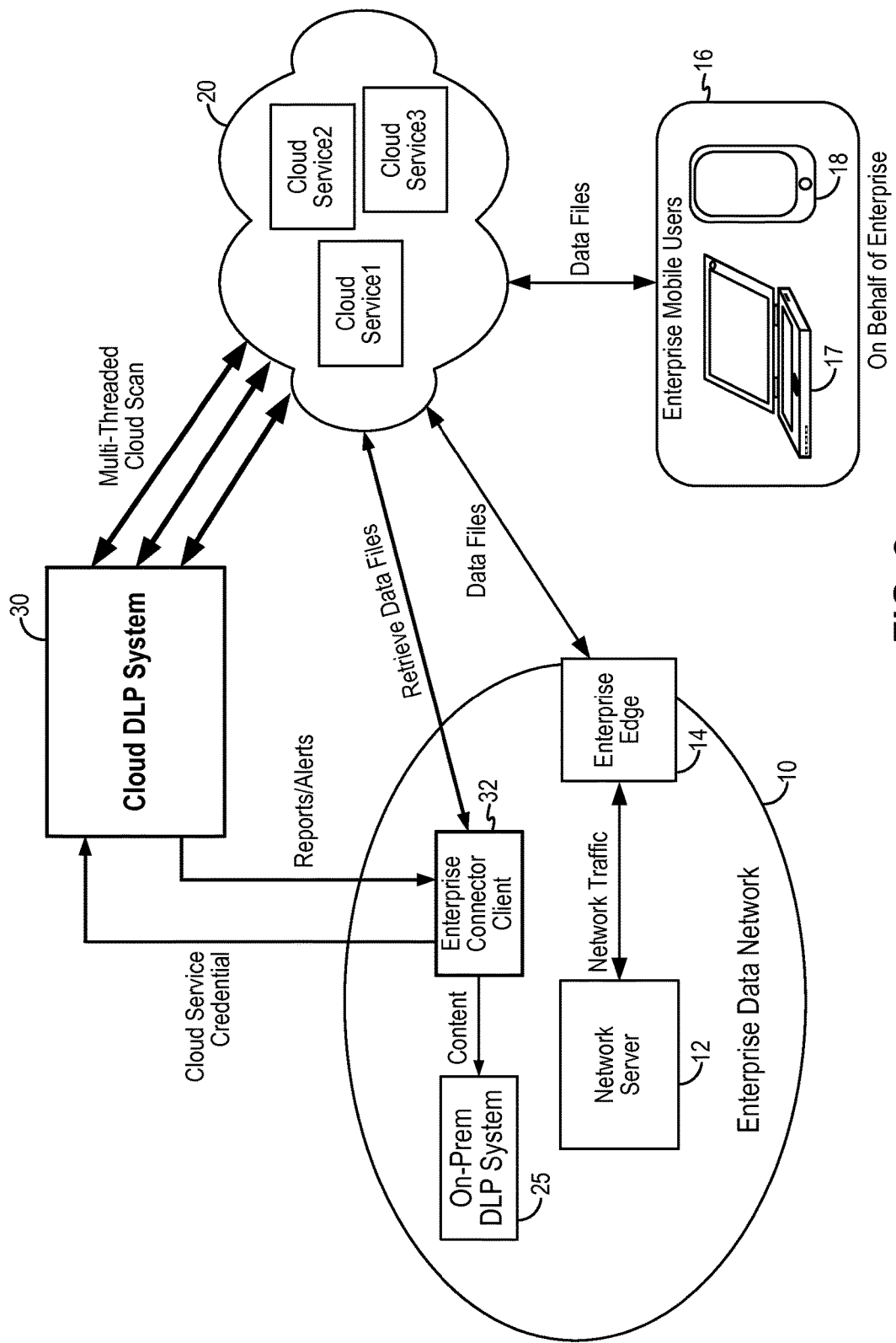
FIG. 2 is a diagram illustrating an environment in which the cloud DLP system of the present invention can be deployed in alternate embodiments.

FIG. 2 is a diagram illustrating an environment in which the cloud DLP system of the present invention can be deployed in alternate embodiments. In some cases, the enterprise may have already deployed an on-premises DLP system and may wish to continue to make use of the on-premises DLP system. In embodiments of the present invention, the cloud DLP system of the present invention can be configured to work integrally with an on-premises DLP system to provide additional security measures for content being stored at cloud services.

Referring to FIG. 2, the enterprise data network 10 has deployed therein an on-premises DLP system 25 as the on-site data loss prevention tool. To integrate the DLP solution provided by the cloud DLP system 30 of the present invention, a client-side component, which can be a client software component or an agent, is installed in the enterprise data network 10. In the present example, the agent is referred to as an enterprise connector client 32. In this case, the enterprise connector client 32 may collect the administrative credentials for the cloud services used by the enterprise and may forward the credentials to the cloud DLP system 30 on behalf of the enterprise. In other embodiments, the system administrator of the enterprise may continue to use the user interface of the cloud DLP system 30 to provide the administrative or login credentials. Using the credentials received from the enterprise, the cloud DLP system 30 obtains access tokens to enable the cloud DLP system 30 to access the enterprise's cloud content stored on the one or more cloud service providers.

With the client-side enterprise connector client 32 thus installed, the cloud DLP system 30 performs scanning of the cloud content to detect for non-compliance or violation of the enterprise's control policies. For example, the cloud DLP system 30 may operate as described above where the system 30 monitors through the cloud service's event API for events related to uploading of files and documents. The cloud DLP system 30 then retrieves the files or documents, such as by downloading the files and document and scans the content of the files or documents relative to the security or control policies of the enterprise.

In the event that the cloud DLP system 30 detects a violation or non-compliance of the enterprise's control and security policies, the cloud DLP system 30 will flag or identify the non-compliance document or file or content. The cloud DLP system 30 may compile reports or alerts listing the detected violations or non-compliance. In one embodiment, the enterprise connector client 32 polls the cloud DLP system 30 or requests from the cloud DLP system 30 the non-compliance reports or alerts. Upon receiving the reports or alerts, the enterprise connector client 32 retrieves the non-compliance cloud content from the cloud services. The non-compliance cloud content may be files or documents or other data format. The enterprise connector client 32 provides the non-compliance content to the on-premises DLP system 25 for further examination.

In some embodiments, the enterprise connector client 32 pushes the non-compliance documents to the on-premises DLP system 25 using the ICAP protocol. The on-premises DLP system 25 may then perform more rigorous policy checks on the suspected content.

In this manner, the cloud DLP system 30 may be used integrally with the enterprise's existing on-premises DLP solution to provide enhanced data loss prevention measures. In some cases, the cloud DLP system 30 can be used as a cloud content pre-processing engine for the on-premises DLP system 25.

To enable the cloud DLP system of the present invention to scan the cloud content of an enterprise, the cloud DLP system must have valid access tokens for each cloud service provider being used by the enterprise so that the DLP system may access the cloud services through supported API. In the above described embodiments, the enterprise provides its administrative credential or login credential to the cloud DLP system. In some cases, the enterprise's security policy may not allow such administration credential or login credential to be transmitted outside of the enterprise's own data network. In embodiments of the present invention, the cloud DLP system implements a secure access authorization method to enable the cloud DLP system to access the enterprise's cloud service providers without receiving the actual administrative credential of the enterprise. In this manner, the enterprise is able to preserve the security and privacy of its credential information.

Figure 3:
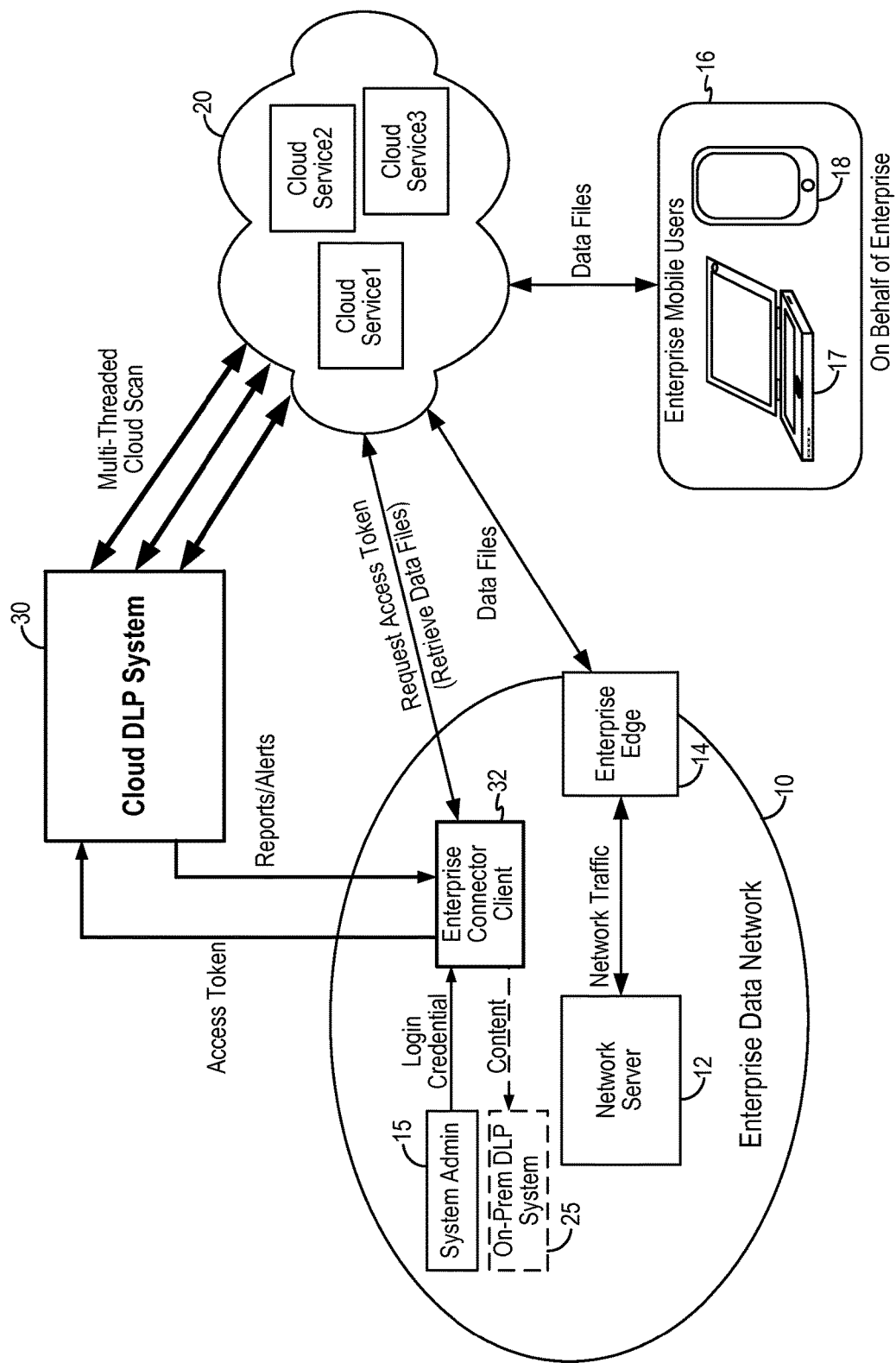
FIG. 3 is a diagram illustrating an environment in which the cloud DLP system of the present invention can be deployed in alternate embodiments of the present invention.

FIG. 3 is a diagram illustrating an environment in which the cloud DLP system of the present invention can be deployed in alternate embodiments of the present invention. Referring to FIG. 3, the secure access authorization method is implemented by installing the enterprise connector client 32 in the enterprise data network 10. The secure access authorization method can be applied in cases where the enterprise has an on-premises DLP system 25 or where the enterprise does not have an on-premises DLP system. The use of or the absence of an on-premises DLP system does not alter the operation of the secure access authorization method of the present invention.

In embodiments of the present invention, the secure access authorization method is operated as follows. The enterprise, such as through its system administrator 15, provides the administrative credential or login credential to the enterprise connector client or agent 32. The administrative or login credential is stored on the enterprise connector client or agent and does not leave the enterprise data network 10. The security of the enterprise's credential information is thus ensured.

The enterprise connector client 32 uses the administrative or login credential to request an access token from each of the cloud service providers. Each cloud service provider, upon authenticating the login credential, provides an access token to the enterprise connector client 32. In embodiments of the present invention, the cloud service providers employ a robust authentication mechanism, such as the OAUTH2 authentication method, which grants access tokens required for API access. Furthermore, in embodiments of the present invention, the access tokens granted are of limited time duration. The enterprise connector client 32 must periodically refresh the access tokens by authenticating with the cloud service providers again using the administrative or login credentials.

Upon receiving the access tokens for accessing the cloud services used by the enterprise, the enterprise connector client 32 shares the access tokens with the cloud DLP system 30. When implemented as a distributed computing system, the cloud DLP system may distribute the access tokens to all the processors of the system to enable each processor to gain access to the cloud content of the enterprise stored on the one or more cloud services. In this manner, the cloud DLP system 30 is able to make API call to the cloud services to access the cloud content of the enterprise without actually receiving the enterprise's login or administrative credential.

Before the expiration of a particular access token, the enterprise connector client 32 refreshes the authentication and receives updated access token from the cloud service provider. The enterprise connector client 32 provides the updated or currently valid access token to the cloud DLP system 30.

By keeping the administrative or login credential of the enterprise on the enterprise data network 10, the enterprise has the ability to revoke the authorization of the cloud DLP system 30 at the enterprise's site. Thus, should the enterprise desire to revoke the authorization, the enterprise, through the system administrator 15, for example, may access the enterprise connector client 32 to remove or cancel or void the login credential for one or more cloud service providers. The enterprise connector client 32 will not be able to obtain updated access tokens for those cloud service providers. When the currently valid access tokens expire, the cloud DLP system 30 will no longer have access to the cloud content of the enterprise. In this manner, the enterprise has complete control of the access authorization it wants to grant to the cloud DLP system 30.

Figure 4:
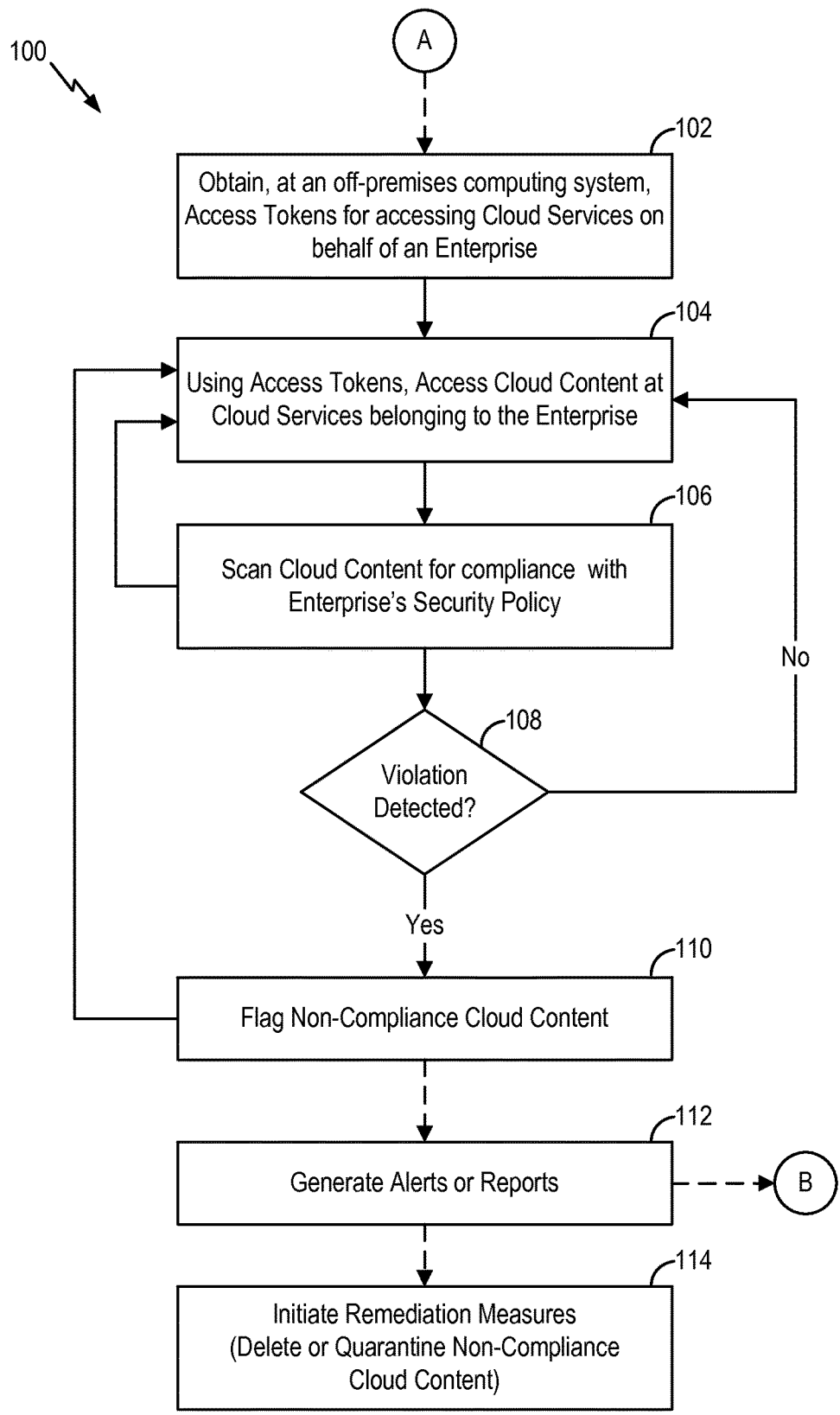
FIG. 4 is a flowchart illustrating a cloud based data loss prevention (DLP) method in embodiments of the present invention.

FIG. 4 is a flowchart illustrating a cloud based data loss prevention (DLP) method in embodiments of the present invention. The cloud based DLP method is employed to provide data loss prevention services for an enterprise. In the present embodiment, the cloud DLP method is implemented in an off-premises computing system deployed off the premises of an enterprise. The off-premises computer system can be the cloud DLP system 30 of FIGS. 1-3 in some embodiments. Referring to FIG. 4, a cloud DLP method 100 starts at 102 to obtain, at an off-premises computing system, access tokens for accessing cloud services on behalf of an enterprise. The access tokens may be obtained using various methods which will be described in more detail below. When the off-premises computing system is implemented as a distributed computing system, the access tokens are distributed to all of the processor of the distributed computing system.

The method 100 then uses the access tokens to access cloud content at the cloud services belonging to the enterprise (104). The method 100 scans the cloud content for compliance with the enterprise's security and control policy (106). In operation, the method 100 continuously access the cloud content and scan the cloud content for policy violation (104-106). In some embodiments, the method 100 uses the cloud services' API to poll for new files or documents that have been recently uploaded to the cloud services. In response to new files or documents being reported by the API, the method 100 scans the new files or documents against the enterprise's security policy.

The method 100 determines when certain cloud content may be in violation of the enterprise's security policy (108). The method 100 continues to access and scan the cloud content when no violation is detected (return to 104).

In the event that method 100 detects certain files or documents as being in violation of the enterprise's security policy, the method 100 identifies or flags the non-compliance cloud content (110). The method 100 then continues to access and scan the cloud content (return to 104). Meanwhile, in some embodiments, the method 100 may generate alerts or reports listing the non-compliance cloud content (112). Furthermore, in other embodiments, the method 100 may initiate remediation measures (114). For example, the method 100 may delete the non-compliance files or documents. Alternately, the method 100 may quarantine the non-compliance content on the cloud service provider to prevent unauthorized access.

Figure 5A:
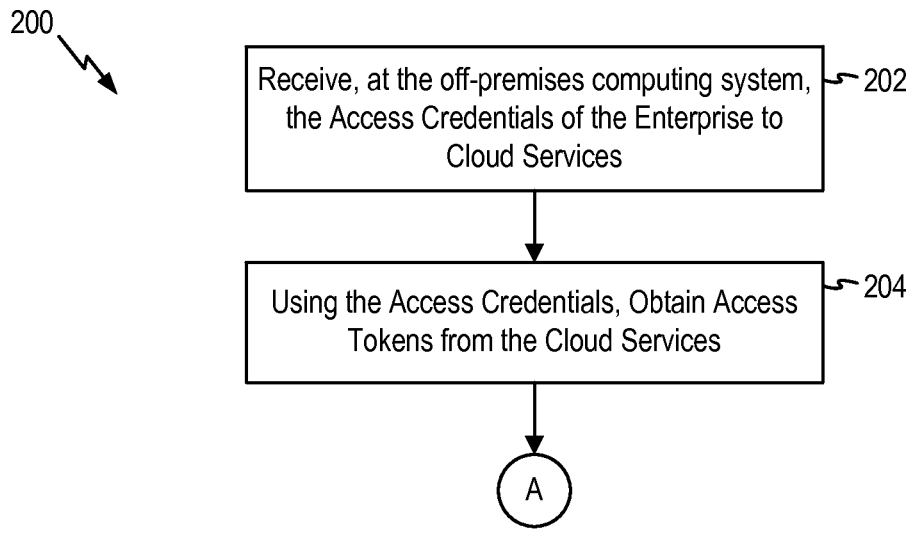
FIG. 5A is a flow chart illustrating a method to obtain access token for cloud services in some embodiments.

In embodiments of the present invention, the off-premises computer system is provided with the access tokens needed to access the cloud services using various methods. FIG. 5A is a flow chart illustrating a method to obtain access token for cloud services in some embodiments. The method 200 of FIG. 5A may be implemented in the off-premises computing system, such as the cloud DLP system 30 of FIGS. 1-3. Referring to FIG. 5A, a method 200 receives at the off-premises computing system the access credentials of the enterprise to one or more cloud services (202). For example, the access credentials can be provided to the off-premises computing system though a user interface, as shown in FIG. 1. Alternately, the access credentials can be provided to the off-premises computing system though an on-premises client, such as the enterprise connector client, as shown in FIG. 2. Through the off-premises computing system, the method 200 then uses the access credentials to obtain access tokens from the cloud services (204). In this manner, the off-premises computing system obtains the access tokens necessary for accessing the cloud services on behalf of the enterprise.

Figure 5B:
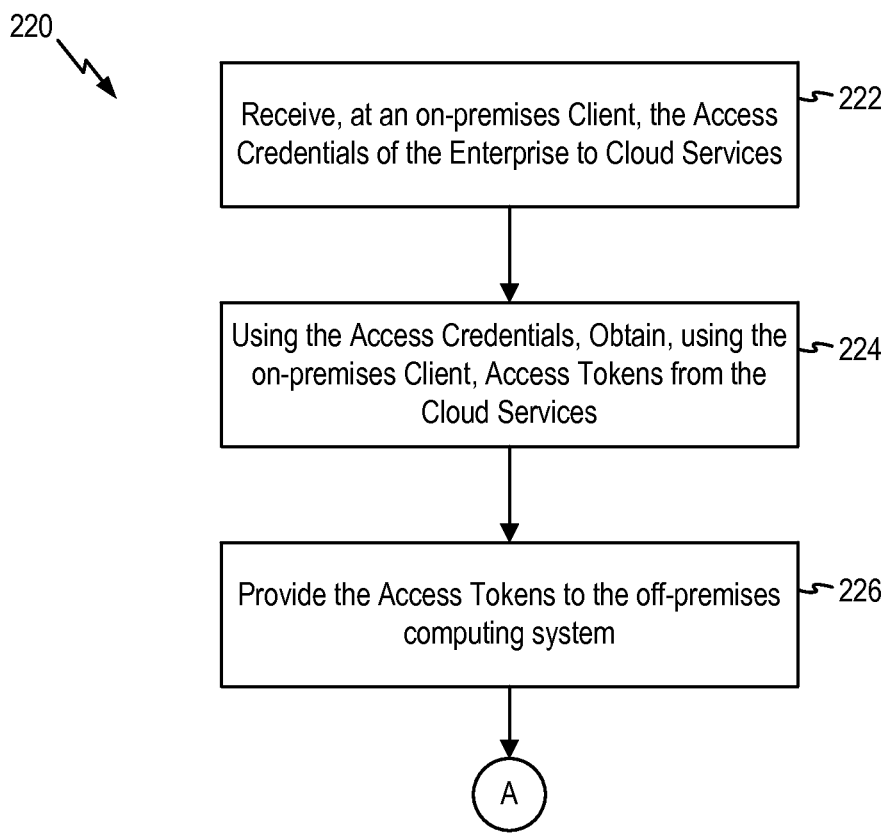
FIG. 5B is a flow chart illustrating a method to obtain access token for cloud services using a secure access authorization method in some embodiments.

FIG. 5B is a flow chart illustrating a method to obtain access token for cloud services using a secure access authorization method in some embodiments. The method 220 of FIG. 5B may be implemented in an on-premises client, such as the enterprise connector client 32 of FIGS. 2-3. Referring to FIG. 5B, a method 220 receives at the on-premises client the access credentials of the enterprise to one or more cloud services (222). For example, the access credentials can be provided to the on-premises client by the system administrator, as shown in FIG. 3. The method 220, through the on-premises client, then uses the access credentials to obtain access tokens from the cloud services (224). The method 220, through the on-premises client, provides the access tokens to the off-premises computing system (226). In this manner, the off-premises computing system obtains the access tokens necessary for accessing the cloud services on behalf of the enterprise.

Figure 6:
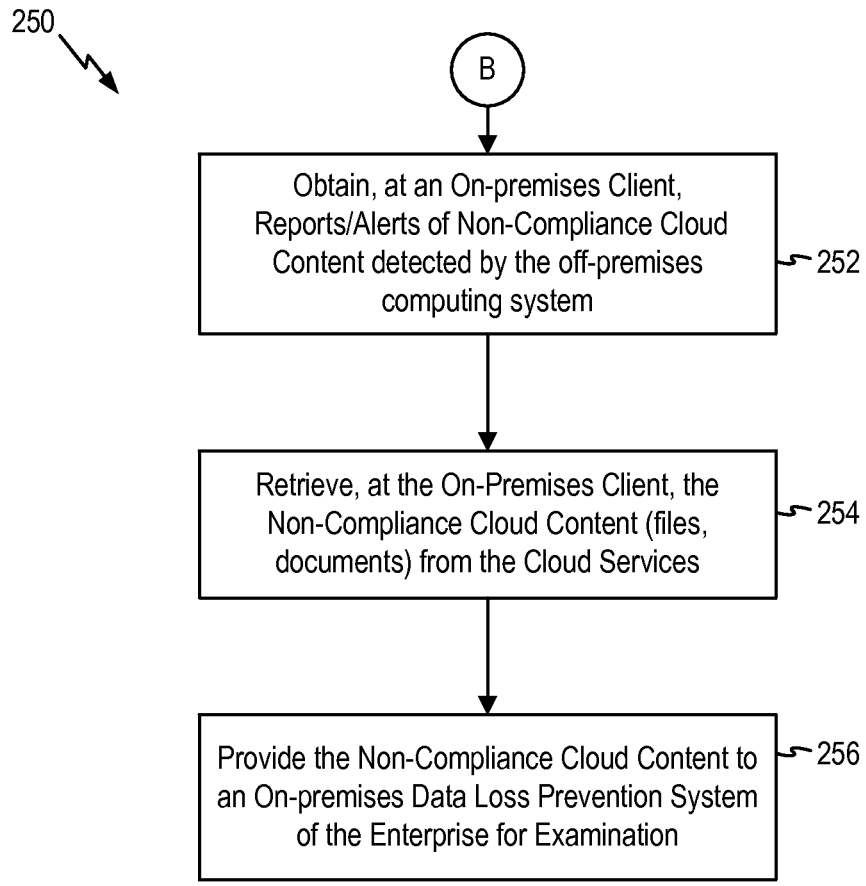
FIG. 6 is a flow chart illustrating a method to integrate the cloud DLP method of FIG. 4 with an on-premises DLP system in some embodiments.

FIG. 6 is a flow chart illustrating a method to integrate the cloud DLP method of FIG. 4 with an on-premises DLP system in some embodiments. In method 100 of FIG. 4, alerts or reports can be generated as a result of detection of certain cloud content of the enterprise being in violation of the security policy. In some cases, the alerts and reports generated by the off-premises computing system may be used cooperatively with an on-premises data loss prevent (DLP) system of the enterprise. Referring to FIG. 6, a method 250 obtains at an on-premises client reports or alerts of non-compliance cloud content detected by the off-premises computing system (252). The alerts or reports may be pushed to the on-premises client. Alternately, the on-premises client may poll the off-premises computing system for the alerts and reports. Upon receiving the alerts or reports, the method 250, through the on-premises client, retrieves the non-compliance cloud content from the cloud services (254). The method 250 then provides the non-compliance cloud content to an on-premises DLP system of the enterprise for further examination (256).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing data loss prevention services to an enterprise operating an enterprise data network, the enterprise data network being in communication with a cloud service provider to store cloud content belonging to the enterprise and to access the stored cloud content on the cloud service provider, the system comprising:

a connector client installed on the premises of the enterprise data network and a cloud based computing system configured outside of the enterprise data network;

the connector client being in communication with the cloud service provider and the cloud based computing system, the connector client being configured to receive, from within the enterprise data network, an access credential of the enterprise for the cloud service provider, the connector client being configured to obtain an access token from the cloud service provider using the access credential of the enterprise, the connector client being configured to provide the access token for the cloud service provider to the cloud based computing system, and the connector client being configured to receive an alert or a report from the cloud based computing system; and the cloud based computing system including at least one hardware processor and being in communication with the connector client and the cloud service provider, the cloud based computing system being configured to receive the access token from the connector client and to distribute the access token to the one or more processors, the cloud based computing system being configured to use the access token to access the cloud service provider on behalf of the enterprise, the cloud based computing system being configured to use the access token to access cloud content at the cloud service provider belonging to the enterprise and to perform multi-thread scanning of the cloud content for compliance with a security policy of the enterprise, the cloud based computing system being configured to identify a non-compliance cloud content in response to detecting certain cloud content stored on the cloud service provider as being in violation of the security policy, the cloud based computing system being configured to generate the alert or the report in response to the detecting and to provide the alert or the report to the connector client, and the cloud based computing system being further configured to initiate a remediation measure in response to detecting certain cloud content as being in violation of the security policy, the remediation measure comprising one or more of deleting the non-compliance cloud content and quarantining the non-compliance cloud content.

2. The system of claim 1, wherein the connector client is configured to receive a plurality of access credentials of the enterprise for respective plurality of cloud service providers and to obtain a plurality of access tokens from the respective plurality of cloud service providers using the plurality of access credential of the enterprise, the connector client being configured to provide the plurality of access tokens to the cloud based computing system; and the cloud based computing system is configured to obtain the plurality access tokens from the connector client for accessing the respective plurality of cloud service providers on behalf of the enterprise, the cloud based computing system being configured to use the access tokens to access cloud content at the plurality of cloud service providers belonging to the enterprise and to perform multi-thread scanning of the cloud content for compliance with the security policy of the enterprise.

3. The system of claim 1, wherein the cloud based computing system comprises a distributed real-time computing system comprising a plurality of processors configured to perform multi-thread scanning of the enterprise's cloud content at the cloud service provider.

4. The system of claim 3, wherein the cloud based computing system is configured to distribute the access token to the plurality of processors of the distributed real-time computing system.

5. The system of claim 1, wherein the cloud based computing system is further configured to generate the alert or the report in response to detecting certain cloud content as being in violation of the security policy, the alert or the report identifying the non-compliance cloud content.

6. The system of claim 1, wherein the cloud content comprises data files or documents or content in other data formats.

7. The system of claim 1, wherein the cloud based computing system is configured to access the cloud service provider using the cloud service provider's application programming interface (API) to access events and contents at the cloud service provider.

8. The system of claim 7, wherein the cloud based computing system is configured to access the cloud service provider using the cloud service provider's event API to poll for cloud content recently uploaded to the cloud service provider and belonging to the enterprise and to retrieve the recently uploaded cloud content to scan for compliance with the security policy of the enterprise.

9. A method for providing data loss prevention services to an enterprise operating an enterprise data network, the enterprise data network being in communication with a cloud service provider to store cloud content belonging to the enterprise and to access the stored cloud content on the cloud service provider, the method comprising:

receiving from within the enterprise data network and at a connector client installed on the premises of the enterprise data network, an access credential of the enterprise for the cloud service provider;

obtaining, at the connector client installed on the premises of the enterprise data network, an access token from the cloud service provider using the access credential of the enterprise;

providing, from the connector client, the access token to a cloud based computing system configured outside of the enterprise data network, the cloud based computing system comprising one or more processors;

receiving, at the cloud based computing system, the access token from the connector client, the access token being used to access the cloud service provider on behalf of the enterprise;

distributing the access token to the one or more processors;

assessing, at the cloud based computing system and using the access token, the cloud content at the cloud service provider belonging to the enterprise;

performing multi-thread scanning, at the cloud based computing system, the cloud content for compliance with a security policy of the enterprise;

identifying, at the cloud based computing system, a non-compliance cloud content in response to detecting certain cloud content stored on the cloud service provider as being in violation of the security policy;

generating, at the cloud based computing system, an alert or a report in response to the detecting;

providing, from the cloud based computing system, the alert or the report to the connector client; and initiating, at the cloud based computing system, a remediation measure in response to detecting certain cloud content as being in violation of the security policy, wherein initiating the remediation measure comprising deleting the non-compliance cloud content or quarantining the non-compliance cloud content.

10. The method of claim 9, further comprising:

receiving, from within the enterprise data network and at the connector client, a plurality of access credentials of the enterprise for respective plurality of cloud service providers;

obtaining a plurality of access tokens from the respective plurality of cloud service providers using the plurality of access credential of the enterprise;

providing the plurality of access tokens to the cloud based computing system;

receiving, at the cloud based computing system, the plurality access tokens from the connector client for accessing respective plurality of cloud service providers on behalf of the enterprise; and assessing, at the cloud based computing system and using the plurality of access tokens, the cloud contents at the plurality of cloud service providers belonging to the enterprise.

11. The method of claim 9, further comprising:

providing a distributed real-time computing system comprising a plurality of processors configured as the cloud based computing system; and performing multi-thread scanning of the enterprise's cloud content at the cloud service using the distributed real-time computing system.

12. The method of claim 11, further comprising:

distributing the access token to the plurality of processors of the distributed real-time computing system.

13. The method of claim 9, further comprising:

generating, at the cloud based computing system, the alert or the report in response to detecting certain cloud content as being in violation of the security policy, the alert or the report identifying the non-compliance cloud content.

14. The method of claim 9, wherein the cloud content comprises data files or documents or content in other data formats.

15. The method of claim 9, wherein assessing, at the cloud based computing system and using the access token, the cloud content at the cloud service provider belonging to the enterprise comprises:

accessing the cloud service provider using the cloud service provider's application programming interface (API) to access events and contents at the cloud service provider.

16. The method of claim 15, wherein accessing the cloud service provider using the cloud service provider's application programming interface (API) to access events and contents at the cloud service provider comprises:

accessing the cloud service provider using the cloud service provider's event API to poll for cloud content recently uploaded to the cloud service provider and belonging to the enterprise; and retrieving the recently uploaded cloud content to scan for compliance with the security policy of the enterprise.

* * * * *